May 1, 1951  P. PARR  2,551,283

FISHING TACKLE BOX

Filed Sept. 14, 1946  2 Sheets-Sheet 1

INVENTOR
PETER PARR

BY John H. Cassidy

ATTORNEY

May 1, 1951 P. PARR 2,551,283
FISHING TACKLE BOX
Filed Sept. 14, 1946 2 Sheets-Sheet 2
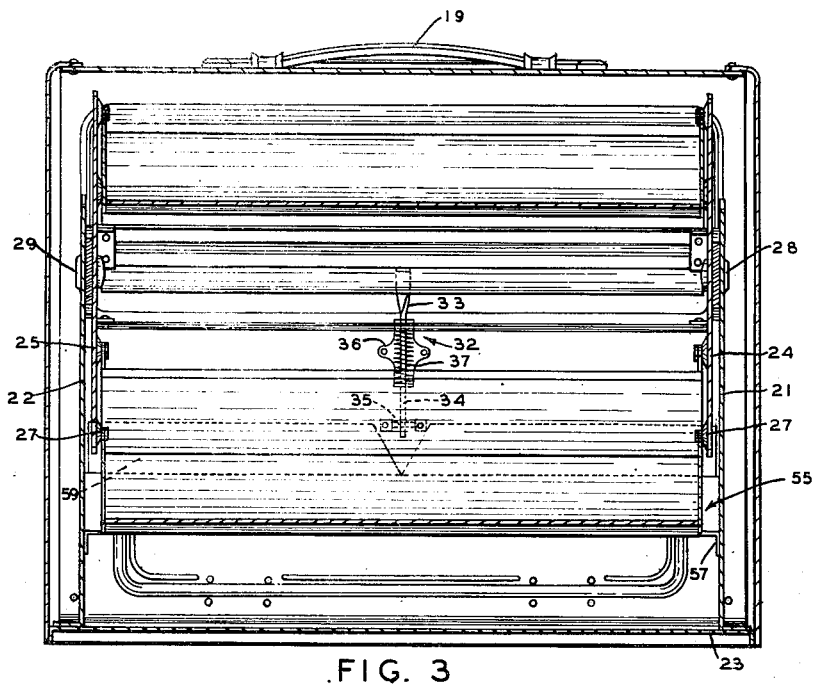
FIG. 3
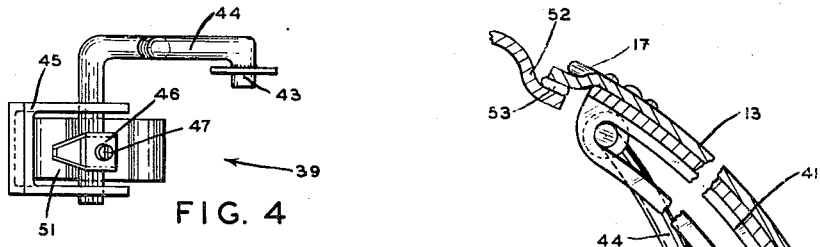
FIG. 4
FIG. 6
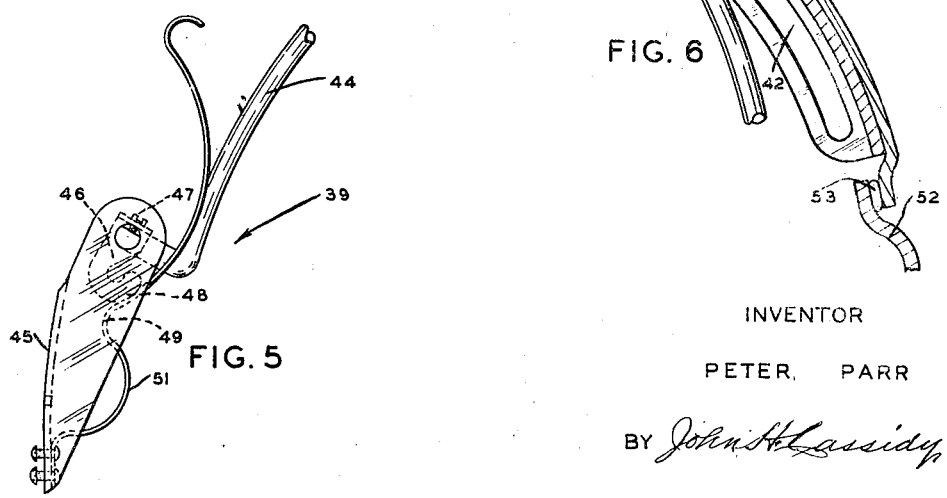
FIG. 5
INVENTOR
PETER PARR
BY John H. Cassidy
ATTORNEY Patented May 1, 1951

2,551,283

UNITED STATES PATENT OFFICE 2,551,283

FISHING TACKLE BOX

Peter Parr, Cuba, Mo.

Application September 14, 1946, Serial No. 697,086

4 Claims. (Cl. 312—267)

This invention relates to a fishing tackle box and has special reference to a cabinet of the rotary utility type in which a series of partitioned receptacles are mounted for rotation about a plurality of longitudinal horizontal axes which are located radially from a central mounting axis, the said receptacles being rotatable for presentation to a plurality of openings in a cabinet housing where their content is made accessible.

In regard to the proper keeping of fishing tackle, a number of individual items, such as hooks, lines, plugs, flies, various kinds of bait, etc., must be kept in separate compartments for the ready use of the fisherman. Other larger items, which need not be segregated, must also be kept for the fisherman's use, and for all, it is necessary that they be secured against unwarranted use, that they be kept clean and dry and that they be readily accessible to the user.

It is, therefore, a general object of the instant invention to provide a tackle box which will meet all of the aforementioned requirements, which is light in weight, of strong and lasting construction, and one that may be manufactured and sold at low cost.

Also, it is the object of the invention to provide a tackle box of the type described, having an auxiliary storage space for articles other than those which are usually segregated, said storage space being provided in combination with a rotary utility cabinet in a manner such that the placement of articles therein will not foul the rotary mechanism.

Figure 1:
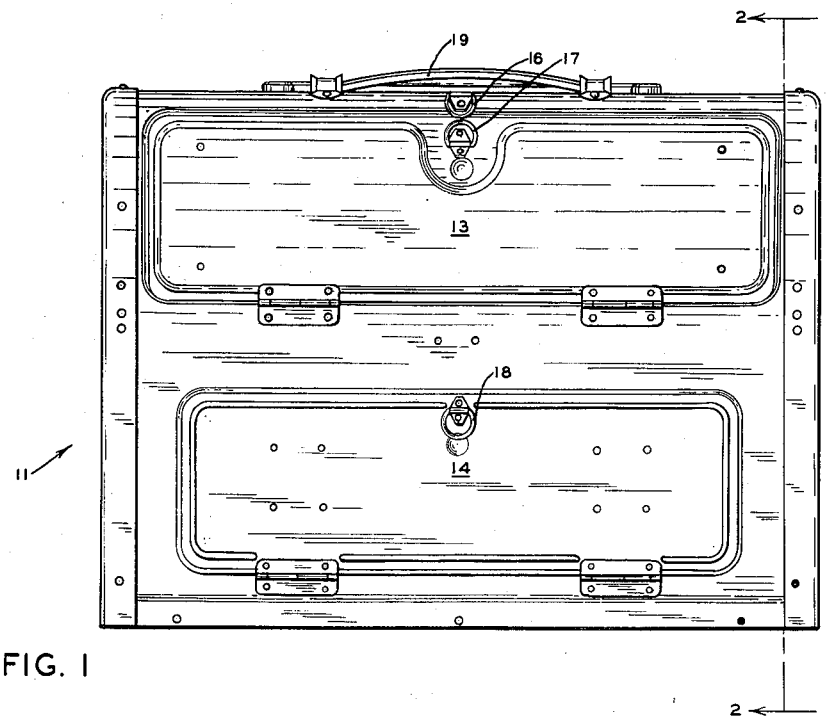
Figure 2:
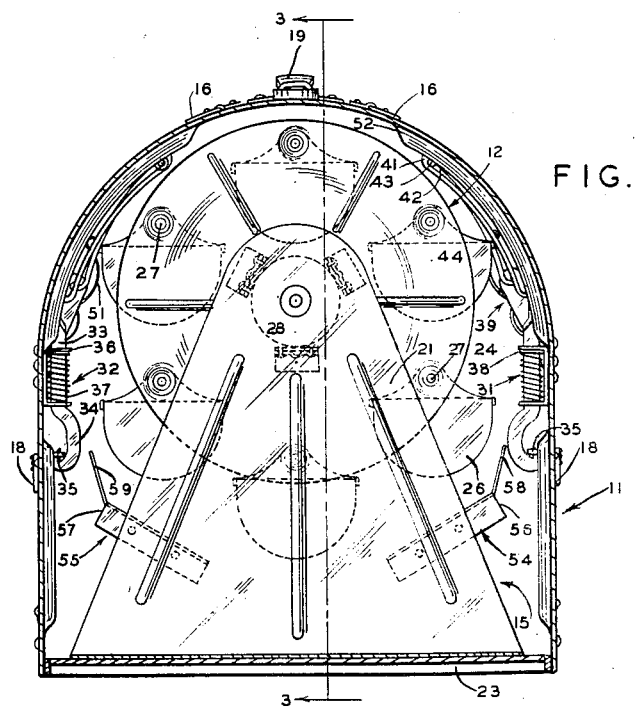

Other objects and advantages will become apparent as the description proceeds and a more comprehensive understanding of the invention will be afforded from the following detailed specification when considered in conjunction with the accompanying drawings, in which Fig. 1 is a side elevational view of a tackle box embodying the instant invention, Fig. 2 is a vertical cross sectional view thereof taken along the line 2—2 of Fig. 1, Fig. 3 is a longitudinal vertical sectional view through the box taken along a line 3—3 indicated on Fig. 2, and Figs. 4, 5 and 6 are top, side, and assembly detail views of a spring latch employed to secure two of the box's doors in closed position.

In the embodiment of the invention illustrated in the drawings, a tackle box is provided which comprises a cabinet housing 11, and a rotary unit generally designated 12. Four openings are made in the housing, each of which is closed by a tightly fitted door. Only two of the doors are shown in the drawings, Fig. 1, the other two being similarly located on the opposite side of the box. Thus, a door 13 closes a top opening in one side of the housing which gives access to elements of the rotary unit 12 and a door 14 closes a lower opening which communicates with a storage space 15 in the bottom of the box. Two recessed rings 16 and 17 are associated with each of the top doors, the former being secured to the housing 11 and the latter to the door. These rings are arranged to receive the bow of a padlock, and when both of the top doors are thus secured, the box is closed against unwarranted use, the two lower doors being latched from the inside in a manner that will be described. To facilitate opening, each of the lower doors 14 is provided with rings 18. Also, a leather handle 19 is attached to the box at the top of the housing to provide for its easy handling.

The rotary unit 12 is preferably constructed in accordance with U. S. Patent No. 2,075,051, issued to Peter Parr, March 30, 1937. Here a pair of end standards 21 and 22 are secured to a base plate 23 which forms the bottom of the housing 11. These standards form the supports for two circular discs 24 and 25 between which a plurality of receptacles 26 are mounted for rotation about the pivots 27, all as described in said patent. Similarly, the discs 24 and 25 are arranged to rotate about two pivots 28 and 29, and by this expedient each of the receptacles 26 may be rotated into position with either of the two top openings in the housing 11 where their content is made accessible through the doors 13. Further, each of the receptacles are partitioned into compartments, as taught in the patent, to provide separate storage facilities for articles that are to be segregated.

As previously stated, the lower doors of the cabinet housing are latched from the inside. For this purpose two spring latches 31 and 32 are provided. Each latch comprises a thumb actuated plunger 33 which terminates in a hooked portion 34, a part of which engages in a latch 35 attached to the inside of the housing 11. The plungers 33 move in a slotted bracket 36 and are surrounded by a compression spring 37 which operates against a stop 38 secured to the plunger, the spring acting to keep the hook engaged in the latch with which it cooperates.

Inasmuch as the top doors of the box are located on the curved portions of the housing 11, it is required that they be held tightly closed. This function is performed by four spring closers 39, one of which is illustrated in detail in Figs.

4-6. One of these closers is fixed to each end of each of the top doors. In each case, the door has fixed to its ends on the inside face thereof a depending track bracket 41. This bracket has an elongated slot 42 therein in which a flanged tip 43 of a closer arm 44 rides. The closer arm 44 is, in turn, pivoted for movement in a bracket 45 which is secured to an inside wall of the housing 11. Also attached to the arm 44 is a lug 46 which is keyed thereto by a screw 47. This lug is fashioned with a cam face 48 which engages with a bent section 49 of a flat spring 51 shaped and bradded to the bracket 45 as shown in Fig. 5. As illustrated in the figure, the various parts of the closer 39 occupy positions to keep the door to which it is attached tightly closed. Thus, the curved section 49 of the spring 51, which is under compression, operates against the cam face 48 of the lug 46 to rotate the arm 44 in a clockwise direction which, in turn, imposes a holding force on the door to which it is attached to maintain the latter tightly closed.

As will be noted in Fig. 6, the top openings in the housing 11 are depressed around their edges as at 52. Since the doors 13 open downwardly and are located on curved sections of the housing 11, it is required that a seal be provided for these doors to prevent rain or dust from entering the box around the door. Such a seal takes the form of a rubber gasket 53 which circumscribes the opening in the housing and occupies a position within the recess 52. Under the spring action of the door closers 39, the doors 13 are held tightly against the gaskets 53 to seal them against the entry of water or dirt.

Since the lower doors opening into the storage compartments 15 are flush with the vertical walls of the housing 11 being recessed therein, the seal is not required for them.

To prevent the fouling of the rotary unit, previously described, by articles placed in the storage space 15, two guards 54 and 55 are provided. These guards take the form of two metal strips 56 and 57 which are bent to form two upwardly extending aprons 58 and 59. Both of the guards are secured between the standards 21 and 22 and are so arranged therebetween as to prevent the placement of any article within the storage space 15 which could foul the rotary unit 12 against movement.

In conformity with the stated objects, the entire box, insofar as is possible, is constructed of thin sheet metal stampings, such as aluminum, which are ribbed for added strength. In this manner a box is provided which is light in weight and economical to construct.

The arrangement of the housing interior into two sections, upper and lower, is of definite advantage, since the sections are in open communication and thus permit of the particular form of closure control pointed out. Each section is accessible from the exterior, but the controls are so arranged that only the closures to the upper section are adapted for external control, the controls for the closures to the lower section being accessible solely internally. Since the two sections are in open communication, due to the spacing of the guarding elements 54 and 55, it is possible to gain access to the lower section through the upper closures, thus making it possible to efficiently remove articles from the lower section by release of but one of the closures of that section. The upper closure must be first opened to permit opening of the lower closure, and the user operating through the upper opening is able to manipulate articles in the lower section to move them toward the lower closure opening, and without any need for opening both closures of the lower section to secure efficient movement of articles.

The rotary unit is of special advantage, especially through the use of the partitioned receptacles, these permitting the carrying of articles of small dimensions, either as individuals or as groups of individuals, and yet assure complete segregation. Due to the pivotal mounting of the receptacle, this segregation is constantly maintained, whether the housing is in stationary position or being transported, or when the rotary unit is being rotated to bring a particular article or group to an opened closure. Since the articles of small dimensions can and will be carried by these receptacles, the segregation is of special advantage, since the location of the rotary unit in the upper section, and the pivoting of the receptacles within the unit, prevents the articles from promiscuous admixture among themselves or their movement into the lower section. And since the content of the lower section is presumably of the larger dimension type, the presence of the guards 54 and 55 prevents movement from the lower section upwardly into the path of travel of the rotary unit, thus preventing liability of the lower content rocking the receptacles and thus dumping the content. It would require practically complete inversion of the housing to expose the space between the guards for the passage of any article of even medium dimensions from passing from the lower section into such path through this space.

Various changes may be made in the details of construction, within the scope of the appended claims, without departing from the spirit of this invention. Parts of the invention may be used without the whole and improvements may be added while retaining some or all of the advantages of the invention.

What is claimed is:

1. In a fishing tackle box, the combination of a portable housing, a rotary utility-carrying unit therein, said unit having a plurality of rotatable receptacles, said housing additionally providing a storage space beneath said unit and having a first pair of openings therein communicating with said unit location and a second pair of openings communicating with said storage space, two doors for closing said first pair of openings, locking means for said two doors, means attached to said housing for sealing said first pair of openings, a pair of doors for closing said second pair of openings having latch means therefor operable solely through said first pair of openings, and guard means affording communication between the unit chamber and said rotary utility unit for preventing articles stored in said storage space from fouling said unit.

2. In combination with a portable housing, a rotary utility-carrying unit mounted therein with the unit having downwardly extending spaced legs, a guard formation for the unit comprising a pair of elongated fins disposed between said legs and in spaced relation lengthwise of said rotary unit, said fins being arranged to prevent the jamming of said rotary unit by articles placed in said storage space, said fins each extending inwardly and downwardly from points immediately below the sides of said rotary units.

3. In portable containers for articles wherein the container is adapted for segregation of articles, such container comprising a portable housing dimensioned to provide internal upper and lower communicating sections, each section being individually accessible through controllable closures carried by the housing for each of the sections with the closures located on opposite sides of the housing, a rotary article-carrying unit positioned and operative within the upper section, said unit having a pair of end standards extending into both sections for supporting the unit, such unit including a plurality of pivoted receptacles carried by and movable with the unit during unit rotary movement, spaced guard means carried by the standards for preventing interference with unit movements by content of the lower section, said closures for the upper section each having mounted on the outer side thereof a ring and said housing having mounted on the outer side thereof a pair of rings each of which is adjacent one of the rings carried by said closures when said closures are in closed position whereby said adjacent rings may be interconnected by a padlock or the like, said closures for the lower section each having mounted upon the inner side thereof a horizontally extending latch bar, said housing having a vertically slidable plunger mounted upon the inner side of said housing adjacent each of said latch bars, a hook at the lower end of each plunger adapted to engage the adjacent latch bar, and a spring surrounding each plunger and adapted to urge said hook into locking engagement with said latch bar.

4. A container as in claim 3 characterized in that the unit includes a pair of sheet metal disks supported pivotally by said standards, a plurality of partitioned receptacles pivotally supported between and by the disks, said container being further characterized in that the guard means comprises a pair of elements in spaced relation and each supported by legs of the standards and extending between the standards in parallelism with the unit axis of rotation, the guard elements being positioned below the unit axis free from the path of movement of the unit and its receptacles and each extending inwardly and downwardly from points adjacent the upper edges of the lower closures.

PETER PARR.

REFERENCES CITED

The following references are of record in the file of this patent:

UNITED STATES PATENTS

| Number | Name | Date |
| --- | --- | --- |
| 367,239 | Roth | July 26, 1887 |
| 557,948 | Bever | Apr. 7, 1896 |
| 2,075,051 | Parr | Mar. 30, 1937 |